Aug. 15, 1967  L. LOCATELLI  3,336,023
APPARATUS FOR MANUFACTURING ELECTRIC INSULATORS MADE
UP OF MEMBERS FITTING INTO ONE ANOTHER
Filed Sept. 17, 1964  2 Sheets-Sheet 1

Inventor
Louis Locatelli

Aug. 15, 1967     L. LOCATELLI     3,336,023
APPARATUS FOR MANUFACTURING ELECTRIC INSULATORS MADE
UP OF MEMBERS FITTING INTO ONE ANOTHER
Filed Sept. 17, 1964     2 Sheets-Sheet 2
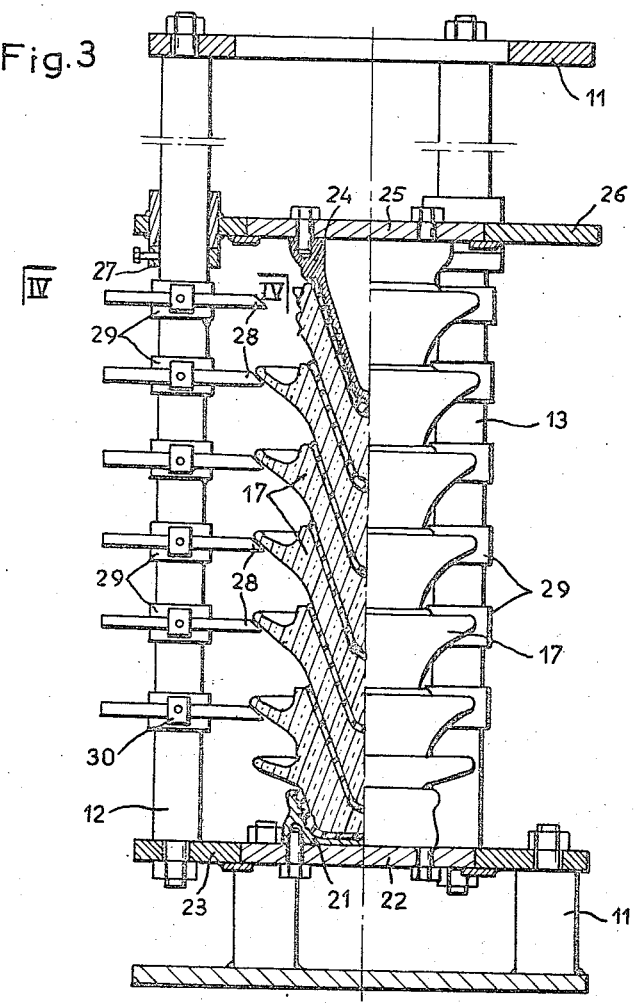
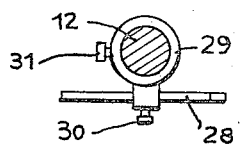
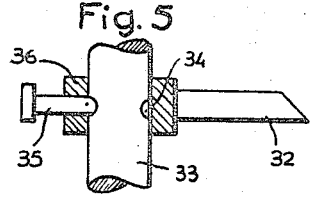
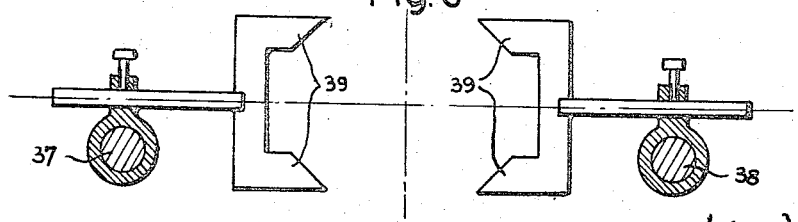

United States Patent Office 3,336,023
Patented Aug. 15, 1967

3,336,023
APPARATUS FOR MANUFACTURING ELECTRIC INSULATORS MADE UP OF MEMBERS FITTING INTO ONE ANOTHER
Louis Locatelli, Saint-Vallier, Drome, France, assignor to Etablissements Merlin & Gerin, Societe Anonyme, Grenoble, France
Filed Sept. 17, 1964, Ser. No. 397,183
Claims priority, application France, Sept. 18, 1963, 947,951
5 Claims. (Cl. 269—296)

ABSTRACT OF THE DISCLOSURE

An apparatus for making an insulating column which has a plurality of interfitting, sealed members arranged along a vertical axis. The apparatus includes columns supporting lugs or fingers each set of which supports the rim of a member so that each member is spaced slightly from adjacent members so that the spaces can be sealed with suitable material, the lugs or fingers on one column being movable to permit lateral removal of the integral insulating column.

This invention relates to an apparatus for manufacturing electric insulators made up of members fitting into one another.

These insulators may for example comprise a number of substantially conical members with flared portions. For the members to be sealed, they have to be stacked in such a way that a small crevice or empty space is left between them for the insertion of the sealing material.

The object of the invention is to provide an apparatus to be used for insulators of different calibres.

A further object is to provide means allowing the complete insulator to be removed easily from the apparatus after sealing.

The invention consists of an apparatus comprising at least two columns bearing a plurality of projections and arranged in a regular manner around the members so as to support the members individually, means being provided to allow the insulator, after sealing, to be removed perpendicularly to the axes of the columns, passing between two columns.

The invention will now be described, by way of example only, with reference to the accompanying drawings. In these:

FIG. 3 is similar to FIG. 1 but shows a different embodiment.

FIG. 4 is a section along the line IV—IV in FIG. 3 through a column.

FIG. 5 is a vertical section through a rotatable finger provided on a column, and FIG. 6 shows a horizontal section through an arrangement with two columns with forks.

Figure 1:
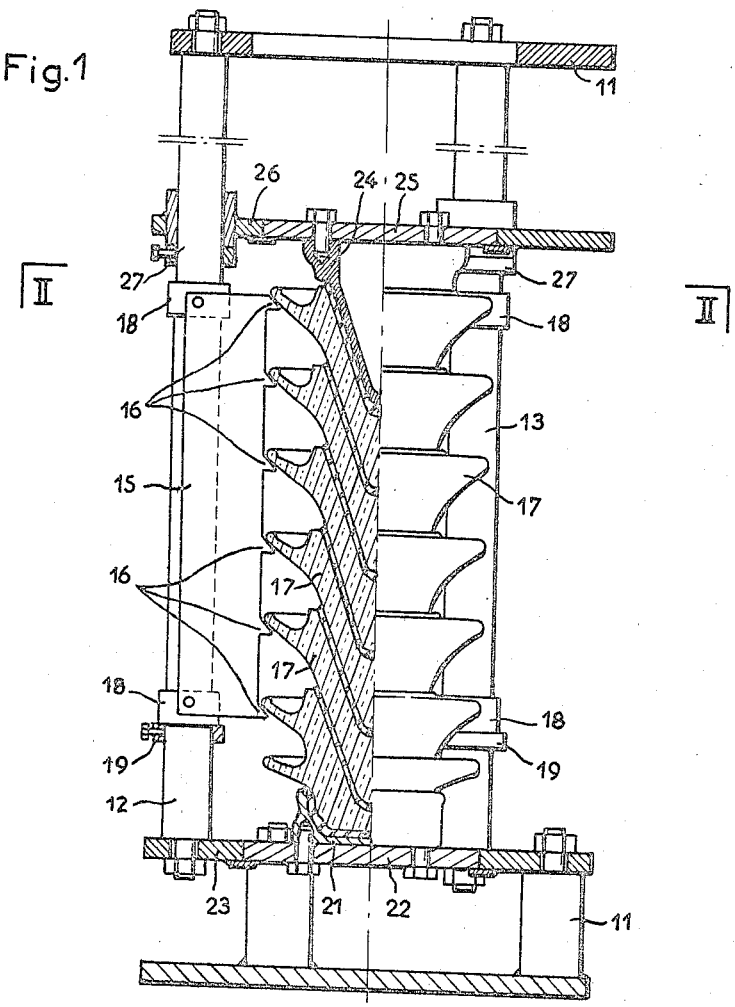
FIG. 1 represents an elevation, partly in section of an arrangement according to the invention.
Figure 2:
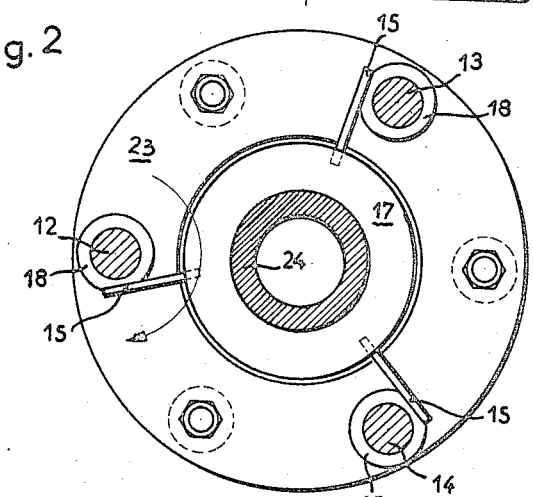
FIG. 2 is a section along line II—II in FIG. 1.

In FIG. 1, the frame 11 of the apparatus has three vertical columns 12, 13 and 14. A gauge 15 with projections in the form of lugs 16 is fixed to each column by means of rings 18, the lower rings resting on collars 19 fixed to the columns and adjustable as to height. The lugs 16 bear ceramic members 17, in such a way that each member 17 is supported by three lugs 16 belonging respectively to the three gauges 15. The vertical distance between the lugs 16 is so selected that a small crevice or empty space is left between the various members 17. If, of course, an insulator comprising members of different dimensions is going to be assembled, other gauges of appropriate shape will have to be provided.

The frame member 21 of the insulator is screwed on to a plate 22 which is supported by a ring 23 rigidly joined to the frame 11 of the apparatus. Similarly, the frame member 24 of the insulator is screwed on to a plate 25 carried by a ring 26 resting on adjustable collars 27 supported on the columns 12, 13, 14.

To assemble the members 17 and seal the insulator, the frame member 21 is first placed in position after being screwed on to the plate 22. Gauges 15 are then selected according to the dimensions of the insulators and are arranged on the columns 12, 13, 14 after the collars 19 have been set at the desired height.

The three gauges 15 have their lugs 16 directed towards the axis of the machine. The members 17 are then arranged on the lugs one after the other. To accomplish this, each member 17 is turned askew so that it fits through the space between lugs 16. To seat member 17 on the proper set of lugs, member 17 is oriented generally as shown in FIGURE 1 and then lowered so that the lugs supportingly engage the member rim. Finally, the collars 27 are set at the desired height on the columns and the ring 26 is supported on the collars in such a way that the plate 25 and frame member 24 (which need not be metal but may equally well be made of ceramics) are suitably arranged relative to the top member 17.

The sealing material can be inserted in the crevices between the members before or after these are put in position. The asssembly is subjected to vibration in order to settle the sealing material, and it is then dried. When the material has set, the insulator is drawn out laterally by turning at least one of the gauges about the axis of its column.

The arrangement shown in FIGS. 3 and 4 is similar to that just described, but the gauges are here replaced by a series of fingers 28 each supported at the desired height on each column by means of collars 29 and by screws 30, 31. One of the columns, for example 12, is rotatable, so that the fingers 28 can be moved away to allow lateral removal of the insulator. The penetration and height of the fingers are adjustable, and so the same apparatus can be used in assembling insulators of very different dimensions. Instead of having a rotatable column, the fingers may be retracted individually to allow removal of the insulator.

FIG. 5 illustrates another embodiment, in which the fingers 32 are individually rotatable about a fixed column 33 comprising slots 34, in which lodge clamping screws 35 screwed into collars 36 supporting the fingers.

Alternatively, only two vertical columns 37 and 38 need be provided, as in FIG. 6. Double fingers or forks 39 are fixed to these in an appropriate manner and support the members of the insulator.

What is claimed is:

1. An apparatus for removably supporting a plurality of interfitting superposed vertically spaced apart insulating articles having a circular peripheral rim, said rims of said articles having a common vertical axis, comprising an article supporting frame, at least two vertical columns secured to said frame, a plurality of vertically spaced apart horizontaly projecting rim supporting members carried by the columns, said rim supporting members comprising a plurality of sets comprising each at least three members horizontally and circumferentially spaced apart with each member extending generally into the space between the columns for supporting the rim of an article, the rim supporting members carried by at least one of said vertical columns being movably mounted on said column between said rim supporting position and a position permitting the horizontal withdrawal of said articles.

2. An apparatus according to claim 1, in which said one column is rotatably mounted on said frame and comprises at least one cylindrical portion, the rim supporting members of said one column comprising a sleeve portion mounted for rotation on said cylindrical portion.

3. An apparatus according to claim 1, in which the rim supporting members of at least one of said columns are horizontally slidably mounted on said column.

4. An apparatus according to claim 1, in which the rim supporting members of at least one of said columns are integral with each other and removably mounted on said column.

5. An apparatus according to claim 1, in which each rim supporting member comprises two integral horizontally spaced horizontally projecting rim supporting fingers.

References Cited

UNITED STATES PATENTS

| | | | |
|---|---|---|---|
| 355,988 | 1/1887 | Gold | 211—176 X |
| 1,051,452 | 1/1913 | Rock | 211—174 |
| 2,669,013 | 2/1954 | Wilson | 269—287 X |
| 2,869,498 | 1/1959 | Whittington | 269—37 X |
| 3,199,683 | 8/1965 | Graswich. | |

FOREIGN PATENTS 1,352,695  4/1963  France.

ROBERT C. RIORDON, *Primary Examiner.*

LESTER M. SWINGLE, *Examiner.*

J. F. McKEOWN, *Assistant Examiner.*